United States Patent [19]

Ducote et al.

[11] Patent Number: 4,531,989
[45] Date of Patent: Jul. 30, 1985

[54] AMINE BONDING AGENTS IN POLYESTER BINDERS

[75] Inventors: Marjorie E. Ducote; Charles L. Greer, Jr., both of Huntsville, Ala.

[73] Assignee: The United States of America as represented by the Secretary of the Army, Washington, D.C.

[21] Appl. No.: 596,345

[22] Filed: Apr. 3, 1984

[51] Int. Cl.$^3$ ............................................. C06B 45/10
[52] U.S. Cl. .................................. 149/19.2; 149/19.4; 149/19.5
[58] Field of Search ..................... 149/19.2, 19.4, 19.5, 149/20

[56] References Cited

U.S. PATENT DOCUMENTS

| | | | |
|---|---|---|---|
| 4,000,023 | 12/1976 | Oberth et al. | 149/19.4 |
| 4,019,933 | 4/1977 | Cuksee et al. | 149/19.4 |
| 4,110,135 | 8/1978 | Graham et al. | 149/19.4 |
| 4,128,441 | 12/1978 | Cuksee et al. | 149/19.4 |
| 4,332,632 | 6/1982 | Conyers et al. | 149/19.4 |
| 4,410,376 | 10/1983 | Bruenner et al. | 149/19.4 |
| 4,410,470 | 10/1983 | Sayles | 149/19.4 |
| 4,411,717 | 10/1983 | Anderson | 149/19.4 |
| 4,430,131 | 2/1984 | Tremblay | 149/19.4 |

*Primary Examiner*—Edward A. Miller

*Attorney, Agent, or Firm*—Anthony T. Lane; Robert P. Gibson; Jack W. Voigt

[57] ABSTRACT

Amine salts which are adducts of an ammonium ion donor selected from ammonium perchlorate, ammonium sulfate, ammonium formate, and equal molar mixture of ammonium perchlorate and ammonium formate and cyanoethyl substituted tetraethylene pentamine (TEPAN) or the glycidol reaction product of cyanoethyl substituted tetraethylene pentamine (TEPANOL) are employed as a bonding agent in a solid propellant composition employing a polyester binder of polydiethyleneglycoladipate.

Unlike hydroxy-terminated polybutadiene wherein a bonding agent is solubilized and still can function as a bonding agent for inorganic ammonium oxidizer salts in the propellant matrix, polyester binders that solubilize the bonding agent renders the bonding agent ineffectual as a bonding agent. Therefore, with a polyester binder it was found that the bonding agent could not be soluble in the prebinder to be effective in improving mechanical properties. It was, however, necessary for the bonding agent to be finely dispersed since it is driven to the inorganic oxidizer salt surfaces where it homopolymerizes around or reacts with a second reactant, usually the propellant curative to form a shell which will subsequently react with the binder thus chemically reinforcing the binder/inorganic oxidizer salt matrix.

11 Claims, 1 Drawing Figure

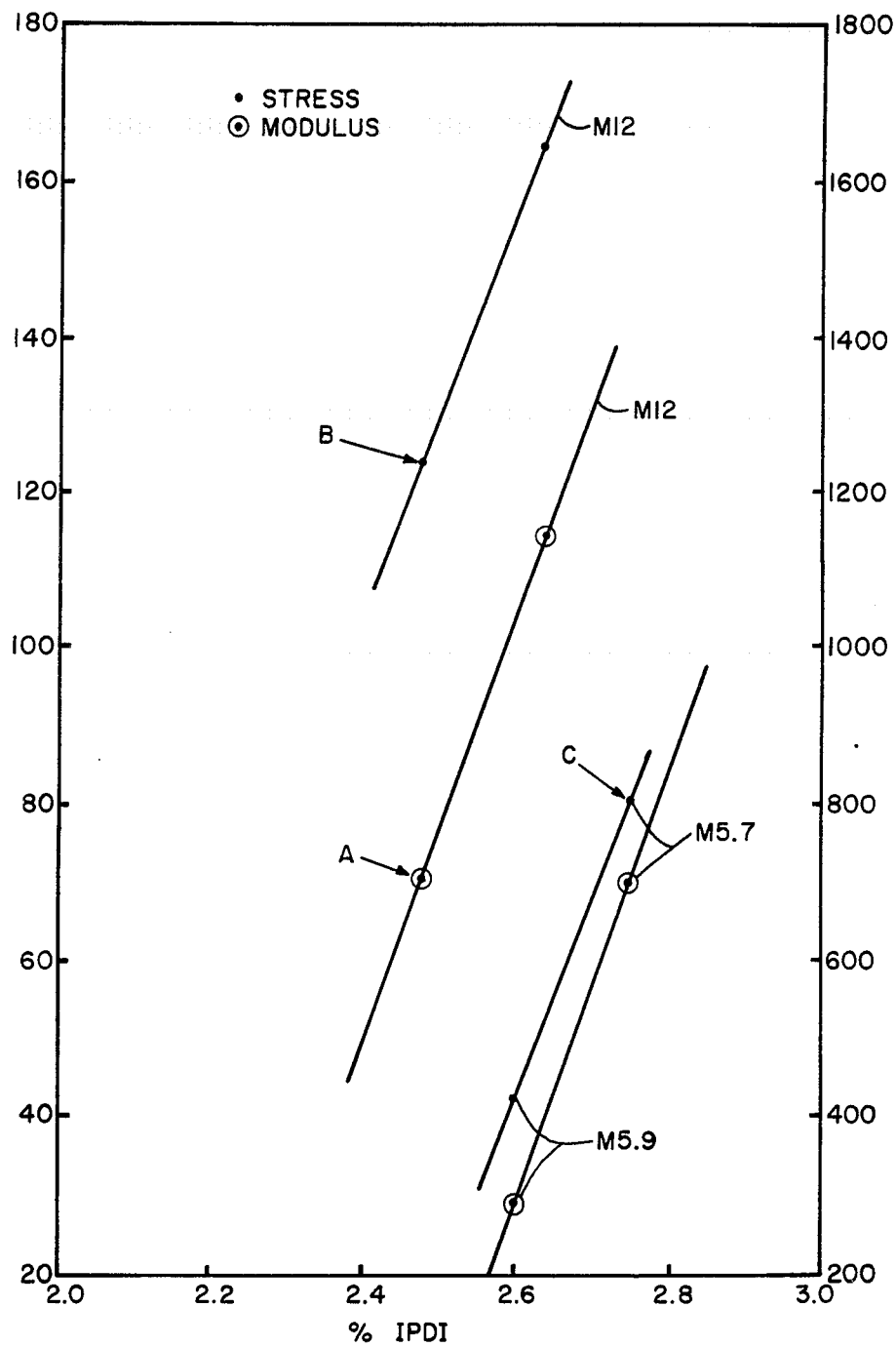

AMINE BONDING AGENTS IN POLYESTER BINDERS

DEDICATORY CLAUSE

The invention described herein may be manufactured, used, and licensed by or for the Government for governmental purposes without the payment to us of any royalties thereon.

BACKGROUND OF THE INVENTION

The function of a bonding agent in an ammonium perchlorate oxidized solid propellant is to adequately coat the ammonium perchlorate (AP) surfaces, a point of disagreement in the propellant field is whether it is desirable for a bonding agent to be soluble in the liquid prebinder. It has been postulated that adequate coating would occur when the bonding agent is dissolved in the prebinder; however, recent experimentations indicated that most bonding agents that are soluble tend to remain dissolved in the binder even after the solid ingredients are added. Some function as a bonding agent still appears to take place in hydroxy-terminated polybutadiene even with solubility of the bonding agent. Better bonding and thus superior mechanical properties and sometimes better aging characteristics have been obtained with highly miscible rather than soluble bonding agent condidates. It is believed that the partial insolubility of such a bonding agent causes it to be driven to the surface of the solids where it is needed to perform its function. At the same time, the partial solubility, miscibility, must be great enough to insure even, adequate coverage of the solids, especially the oxidizer such as ammonium perchlorate, (AP). The bonding agent covering the AP surface subsequently reacts with components in the binder, especially the curing agent so that the encapsulated AP is mechanically and chemically bound to the elastic binder, thus reinforcing the matrix system to give superior physical properties. If the bonding agent is soluble in the binder and there is no force such as a chemical reaction to drive the bonding agent to the surface of the AP, e.g., amine containing bonding agent, much of the bonding agent tends to remain dissolved in the binder and subsequently reacts "in situ" with the binder ingredients, especially the polymer and the curing agent, rather than first encapsulting the AP.

A state of the art bonding agent HX752, a difunctional aziridine, is soluble in both hydroxyterminated polybutadiene (HTPB) and polyester binders at 140° F. In HTPB propellants with proper processing procedures HX752 performs as an adequate bonding agent. It is chosen many times because of availability and ease of incorporation into the propellant. However, when HX752 was used in a polyester binder with AP oxidizer, no bonding occurred.

Since HTPB binders have been more widely used in propellants the problem described above has not come to light because "state-of-the-art bonding agents" function to some degree as bonding agents in HTPB propellant regardless of their solubility relationship in the prebinder. The decrease in bonding agent performance has, perhaps by necessity, been compensated for in HTPB propellants by experimentally adjusting the amount of the bonding agent to achieve the desired strain at maximum stress/break for a required mission.

Recent propellant developments show that some state-of-the-art bonding agents used in HTPB propellants do not function as bonding agents in a polyester binder. Further, bonding agents such as cyanoethyl substituted tetraethylene pentamine (TEPAN) disclosed in U.S. Pat. No. 4,000,023 and the glycidol reaction product of cyanoethyl substituted tetraethylene pentamine (TEPANOL) have been employed as bonding agents for polyurethane containing ammonium perchlorate oxidizing agent. These bonding agents (TEPAN or TEPANOL), in use, produced a disadvantage in that ammonia is liberated during the propellant mix and cure cycles due to displacement of ammonia from ammonium perchlorate (AP) by amine groups in the bonding agent. The amine-ammonium perchlorate reaction required subsequent ammonia removal from the mix because ammonia could consume part of the isocyanate curing agent and thus interfere with the cure and the mechanism for achieving more desirable mechanical properties.

The above problems were obviated by reacting TEPAN or TEPANOL with a selected ammonium oxidizer salt to form an adduct of TEPAN or TEPANOL and selected oxidizer salt. These adducts of selected ammonium oxidizer salts, e.g., ammonium perchlorate (AP), ammonium nitrate (AN), ammonium sulfate (AS) and ammonium formate (AF), and their use in propellants employing HTPB binders are disclosed and claimed in copending patent application Ser. No. 488,249 by Ducote et al., filed June 9, 1983, and now U.S. Pat. No. 4,493,741.

The present invention relates to bonding agents for solid propellants employing polyester binders.

Therefore, an object of this invention is to provide excellent bonding agents for use in propellants employing polyester binders.

A further object of this invention is to provide a bonding agent which has excellent performance as a bonding agent with co-oxidizer ammonium salts in a polyester binder propellant system.

SUMMARY OF THE INVENTION

Amine salts when finely dispersed in a solid propellant composition employing a polyester binder improve the propellant mechanical properties. When finely dispersed (rather than dissolved) the amine salt is driven to the ammonium oxidizer salt surfaces where is encapsulates the ammonium oxidizer and subsequently reacts with the binder, thus chemically reinforcing the binder-/ammonium salt oxidizer matrix.

The solid propellant is comprised of a binder of the polyester polydiethyleneglycoladipate, polycaprolactone which functions as a trifunctional polymer for crosslinking, dioctyladipate plasticizer, isophorone diisocyanate curing agent, and triphenylbismuth and maleic anhydride. Solid oxidizers of ammonium perchlorate and ammonium sulfate are employed.

The partially cyanoacrylated tetraethylene pentamine (TEPAN) is treated with ammonium perchlorate to yield the adduct of TEPAN and AP. This adduct contains a ratio of ammonium ion from AP in ratio of 1.8 per mole of TEPAN. TEPAN adduct salt is referred to as amine salt TC18. TC18 when employed as an additive in a baseline polyester binder propellant composition maintained greater strain at maximum stress values at 74° F. an 130° F. processing condition as compared with a baseline propellant composition containing no bonding agent or as compared with a baseline propellant composition containing a prior art aziridine bonding agent.

BRIEF DESCRIPTION OF THE DRAWING

The single FIGURE of drawing depicts plottings of mechanical property data for improved propellant containing the amine salt as bonding agent as compared to control propellants cured with various levels of curing agent but containing no bonding agent.

DESCRIPTION OF THE PREFERRED EMBODIMENT

A solid propellant which contains a polyester binder requires a bonding agent that is finely dispersed since a bonding agent that is soluble in a polyester binder has been found to be ineffective as a bonding agent. This finding is unexpected since the prior art propellants containing hydroxy-terminated polybutadiene (HTPB) binder function with aziridine bonding agents and amine bonding agents even when soluble in HTPB.

A bonding agent to function properly in a propellant system must coat the oxidizer (AP) surfaces. If the oxidizer (AP) surfaces are not adequately coated with the bonding agent the AP is only partially bonded to the binder matrix, and the soluble bonding agent remaining in the binder matrix reacts with the polymer and/or curing agent.

The amine salt, formed as the adduct of partially cyanoacrylated tetraethylene pentamine (TEPAN) and ammonium perchlorate, is finely dispersed as an additive and functions efficiently as a bonding agent in a polyester binder propellant containing the ingredients set forth below in Table I.

TABLE I

| BASELINE COMPOSITION | |
| --- | --- |
| Polydiethyleneglycoladipate, PGA (R-18) | 22.79–22.29 |
| Isophorone diisocyanate, IPDI | |
| Polycaprolactone, PCP-0310 | 3.72 |
| Dioctyladipate plasticizer, DOA | 4.00 |
| Ammonium Sulfate, AS | 6.00 |
| Ammonium Perchlorate, AP | 67.00 |
| Triphenylbismuth, TPB | 0.015 |
| Maleic Anhydride, MA | 0.015 |

Table II, below, sets forth composition variations of curing agent and bonding agent in the mixes shown.

TABLE II

| COMPOSITION VARIATIONS | | |
| --- | --- | --- |
| Mix No. | % IPDI | Bonding Agent/% |
| M5.7 | 2.75 | None |
| M5.9 | 2.60 | None |
| M11 | 2.57 | HX752 - 0.20 |
| M12 | 2.64 | TC18 - 0.20 |

HX752 is a difunctional aziridine which functions as a bonding agent in HTPB propellants. HX752 is soluble in HTPB at 140° F., and though solubility is not thought to be desirable, HX752 does perform as a bonding agent in HTPB propellants. Unexpectedly, no improvement in physical properties occurrred when the HX752 was added to the polyester binder system. Finely dispersed TC18 did function quite well as a bonding agent in propellant M12 employing a polyester binder as evidenced by the mechanical properties comparisons in Table III below.

TABLE III

| | MECHANICAL PROPERTIES | | | | | |
| --- | --- | --- | --- | --- | --- | --- |
| | At 74° F. Stain at | | | At +130° F. Stain at | | |
| Mix No. | Max Stress psi | Max Str/Brk % | Modulus psi | Max Stress psi | Max Str/Brk % | Modulus psi |
| M5.7 | 80 | 16.6/20.8 | 697 | 42 | 13.6/20.0 | 456 |
| M5.9 | 42 | 27.7/82.5 | 291 | | | |
| M11 | 86 | 18.1/36.9 | 748 | 56 | 15.0/21.4 | 510 |
| M12 | 164 | 25.0/31.2 | 1139 | 141 | 19.0/20.1 | 1086 |

Two mixes of the baseline composition as shown in Table I were processed without bonding agent, e.g., mixes M5.7 and M5.9 of Tables II and III. The binder was comprised of the polymer PGA(R18), a polyester, PCP 0310, a trifunctional polymer for crosslinking, DOA as the plasticizer, IPDI curing agent and TPB and MA as the cure catalyst system. The solid oxidizers were AP and AS.

The low stress and strain at both 74° and 130° F. of mixes M5.7 and M5.9 indicated the necessity of introducing a bonding agent to the composition for the required mission.

A state-of-the-art bonding agent for HTPB propellants HX752, a difunctional aziridine, was added to the baseline composition in Mix M11. The HX752 was soluble in the polyester prebinder. Unexpectedly no improvements in physical properties occurred when the HX752 was added to the polyester binder. This indicated that the usual AP bonding agents used in other polymer systems might not function in the polyester binder. The amine salt, TC18, was found to be not soluble in the polyester binder, however, it was readily dispersable. Being widely dispersed was found to be preferred to solubility since the polyamine and amine salts act by another mechanism. TC18, for example, was found to coat the oxidizer surfaces after being finely dispersed and subsequently attaching themselves chemically to the ammonium ion in ammonium oxidizer salts, e.g., AP and AS in the propellant composition, after which further interaction is achieved to form a secure bond of the oxidizer with the binder matrix. Since TEPAN requires special processing to compensate for ammonia formation during mixing, an amine salt was selected for evaluation. To minimize ammonia libration and to keep mix time short, the amine salt, TC18 (reaction product of 1.8 moles of ammonium perchlorate and 1.0 TEPAN), was determined to be the best candidate for Mix M12.

The TC18 was not soluble in the prebinder but could be readily dispersed. Processing was not affected. End of mix viscosity for mixes M5.7 and M5.9 was 3.7 kp at 140° F. and 3.5 kp at 140° F. for Mix M12.

As shown in Table III, stress, strain and modulus significantly increases in M12 at both 74° and 130° F. Whereas stress decreases by 48% from 74° to 130° F. in Mix 5.7, stress decreased by only 14% when TC18 bonding agent was incorporated. Even though M12 was cured to a higher modulus (harder) it still had 34% greater strain at maximum stress at 74° F. than M5.7.

Extrapolation of mechanical property data from M5.7 and M5.9, as shown in the single figure of drawing, indicates that if the cure stoichiometry were reduced in M12 so that it had a modulus 700 psi (Point A) (directly comparable to modulus of M5.7) it would still have a maximum stress of 123 psi (point B), which is 54% greater than the 80 psi stress (Point C) of M5.7.

The data above conclusively show that finely dispersed polyamines and amine salts perform effectively as bonding agents in polyester binders. The results of this data is graphically depicted in the drawing which shows the improved stress and modulus values for Mix M12 as compared with mixes M5.7 and M5.9.

Although the complete disclosures of TEPAN and TEPANOL adducts, their preparations and uses in HTPB propellants are provided in patent application Ser. No. 488,249, filed June 9, 1983, their preparation, code numbers, and bonding agent identification are provided below for convenience.

PROCEDURE FOR PREPARATION OF TEPAN ADDUCT

The quantities of ammonium oxidizer salt and TEPAN to give the desired adduct ratio are calculated, and the ammonium salt is dissolved in about five times its weight of distilled water (the quantity of water is not critical). The salt solution is then added slowly to TEPAN with stirring at room temperature. Ammonia is liberated during and for a time after addition of the salt solution, as detected by odor. After approximately one hour at room temperature the mixture is loosely covered and placed in a 70° C.-80° C. oven for three days. Then the adduct solution is transferred to an evaporating dish and dried by initial open exposure in the 70°-80° C. oven followed by final drying under vacuum. Many of the adducts tended to pick up water when exposed to ambient laboratory air, so finished adducts are stored in desiccators until used.

Table IV discloses bonding agent identification and mole ratios of the ammonium ion and amines in the bonding agents that can be used in a similar manner as TC18.

TABLE IV

BONDING AGENT IDENTIFICATION

| Amine Salt Bonding Agents | Ammonium Ion Donor (Aid) | Moles Aid Per Mole Polyamine | Amine | Unreacted Amine Equivalents |
|---|---|---|---|---|
| TC-10 | Ammonium Perchlorate | 1.0 | TEPAN | 4.0 |
| TC-12 | Ammonium Perchlorate | 1.2 | TEPAN | 3.8 |
| TC-18 | Ammonium Perchlorate | 1.8 | TEPAN | 3.2 |
| TC-20 | Ammonium Perchlorate | 2.0 | TEPAN | 3.0 |
| TS-18 | Ammonium Sulfate | 1.8 | TEPAN | 3.2 |
| TS-36 | Ammonium Sulfate | 3.6 | TEPAN | 1.2 |
| TF-20 | Ammonium Formate | 2.0 | TEPAN | 3.0 |
| TFC-12 | Ammonium Formate & Ammonium Perchlorate | 0.6 / 0.6 | TEPAN / TEPAN | 3.8 |
| TOC 145 | Ammonium Perchlorate | 1.45 | TEPANOL | 3.55 |

*TEPAN has about five amine equivalents present as secondary and a few tertiary amines (confirmed by IR).

The number after each amine salt bonding agent designates its adduct ratio. The codes for the various adduct are identified below.

TC—TEPAN+AP (ammonium perchlorate)
TS—TEPAN+AS (ammonium sulfate )
TF—TEPAN+AF (ammonium formate)
TFC—TEPAN+50/50 equivalents AP and AF

SPECIAL COMMENTS ABOUT TEPAN ADDUCT AND AMINE GROUPS EQUIVALENTS REQUIRED TO BE REACTED WITH IN POLYAMINE

More that 25% of the amine groups in the polyamine must be reacted to minimize ammonia evolution when the amine salt adduct is employed in a propellant composition as a bonding agent.

Prereaction of approximately 36% of amine groups in the polyamine appears to be optimum to minimize ammonia evolution and obtain optimum physical properties without the necessity of a dispersing aid.

Processing time can be greatly reduced with the use of amine salt bonding agents with no loss in propellant mechanical properties or processibility, and without equipment change.

Since ammonia evolution is minimized, mechanical property reproducibility may be expected to be increased even with a reduction in mix time.

We claim:

1. A solid propellant composition employing a high-solids loading of about 67 parts of an ammonium oxidizer salt selected from ammonium perchlorate, ammonium nitrate, ammonium sulfate, and ammonium formate; a polyester binder system comprised of from about 22.29 to about 22.79 parts of the polyester polydiethyleneglycoladipate, a trifunctional polymer for crosslinking of about 3.72 parts of polycaprolactone, and a plasticizer of about 4.00 parts of dioctyladipate; a curing agent of isophorone diisocyanate of about 2.64 parts; a curing catalyst of triphenylbismuth and maleic anhydride of 0.015 parts each respectively; and a finely dispersed amine salt adduct of about 0.20 parts as a bonding agent that is insoluble in said polyester binder system, said finely dispersed amine salt bonding agent being an adduct of an ammonium salt selected from the ammonium salts consisting of ammonium perchlorate, ammonium nitrate, ammonium sulfate, and ammonium formate and an amine compound selected from the polyamine compounds consisting of cyanoethyl substituted tetraethylene pentamine and the glycidol reaction product of cyanoethyl substituted tetraethylene pentamine.

2. In a solid propellant composition as set forth in claim 1 wherein said amine salt adduct bonding agent is further defined as being the reaction product produced by the process which comprises:
   (i) dissolving a molar quantity from about 1.0 to about 2.0 of said ammonium salt in about five times its weight of water to form a solution of said ammonium salt;
   (ii) slowly adding said ammonium salt solution to said polyamine compound which is present in a molar quantity of about 1.0 while stirring at room temperature;
   (iii) reacting said ammonium salt solution and said polyamine compound together for about one hour at room temperature to form an amine salt adduct solution while permitting the liberation of ammonia;
   (iv) covering loosely said amine salt adduct solution after about one hour reaction time and placing same in a 70° C.-80° C. oven to continue said reacting for about three days;
   (v) transferring said amine salt solution to an evaporating dish and drying initially by open exposure in a 70° C.-80° C. oven followed by final drying under vacuum; and (vi) recovering said dried amine salt adduct and storing said dried amine salt adduct in a suitable container to prevent absorption of moisture.

3. The solid propellant composition of claim 2 wherein said ammonium salt is ammonium perchlorate and wherein said polyamine compound is cyanoethyl substituted tetraethylene pentamine.

4. The solid propellant composition of claim 2 wherein said ammonium salt is ammonium nitrate and wherein said polyamine compound is cyanoethyl substituted tetraethylene pentamine.

5. The solid propellant composition of claim 2 wherein said ammonium salt is ammonium sulfate and wherein said polyamine compound is cyanoethyl substituted tetraethylene pentamine.

6. The solid propellant composition of claim 2 wherein said ammonium salt is ammonium formate and wherein said polyamine compound is cyanoethyl substituted tetraethylene pentamine.

7. The solid propellant composition of claim 2 wherein said ammonium salt is ammonium nitrate and wherein said polyamine compound is the glycidol reaction product of cyanoethyl substituted tetraethylene pentamine.

8. The solid propellant composition of claim 2 wherein said ammonium salt is ammonium sulfate and wherein said polyamine compound is the glycidol reaction product of cyanoethyl substituted tetraethylene pentamine.

9. The solid propellant composition of claim 2 wherein said ammonium salt is ammonium perchlorate and wherein said polyamine compound is the glycidol reaction product of cyanoethyl substituted tetraethylene pentamine.

10. The solid propellant composition of claim 2 wherein said ammonium salt is ammonium formate and wherein said polyamine compound is the glycidol reaction product of cyanoethyl substituted tetraethylene pentamine.

11. The solid propellant composition of claim 2 wherein said polyamine compound during processing has from about 25 percent to about 36 percent of its amine groups reacted with said selected ammonium salt to yield said amine salt adduct bonding agent which minimizes in situ ammonia generation in the propellant composition and decreases mixing time required for mixing the propellant composition without sacrificing the mechanical properties achieved from using said amine salt adduct as the bonding agent for said propellant composition as compared with a like propellant composition employing said polyamine compound as the bonding agent.

* * * * *